(12) United States Patent
Xie (10) Patent No.: US 11,690,327 B2
(45) Date of Patent: Jul. 4, 2023

(54) ANNULAR LED GROW LIGHT

(71) Applicant: SHENZHEN AURORA TECHNOLOGY LIMITED, Shenzhen (CN)

(72) Inventor: Qingbo Xie, Shenzhen (CN)

(73) Assignee: SHENZHEN AURORA TECHNOLOGY LIMITED, Shenzhen (CN)

(*) Notice: Subject to any disclaimer, the term of this patent is extended or adjusted under 35 U.S.C. 154(b) by 0 days.

(21) Appl. No.: 17/485,428

(22) Filed: Sep. 26, 2021

(65) Prior Publication Data
US 2023/0060567 A1   Mar. 2, 2023

(30) Foreign Application Priority Data
Aug. 10, 2021 (CN) .......................... 202121858192.1

(51) Int. Cl.
| | | |
|---|---|---|
| *A01G 9/24* | (2006.01) | |
| *A01G 7/04* | (2006.01) | |
| *F21V 29/85* | (2015.01) | |
| *F21V 23/02* | (2006.01) | |
| *F21S 8/06* | (2006.01) | |
| *F21V 29/503* | (2015.01) | |
| *F21Y 113/13* | (2016.01) | |
| *F21Y 115/10* | (2016.01) | |
| *F21Y 105/18* | (2016.01) | |
| *F21Y 105/16* | (2016.01) | |

(52) U.S. Cl.
CPC .............. *A01G 9/249* (2019.05); *A01G 7/045* (2013.01); *F21S 8/061* (2013.01); *F21V 23/023* (2013.01); *F21V 29/503* (2015.01); *F21V 29/85* (2015.01); *F21Y 2105/16* (2016.08); *F21Y 2105/18* (2016.08); *F21Y 2113/13* (2016.08); *F21Y 2115/10* (2016.08)

(58) Field of Classification Search
CPC .......... A01G 7/045; A01G 9/249; F21V 29/70
See application file for complete search history.

(56) References Cited

U.S. PATENT DOCUMENTS

| | | | | |
|---|---|---|---|---|
| 2012/0281413 A1* | 11/2012 | Lewis | .................... | A01G 9/249 362/249.11 |
| 2013/0094204 A1* | 4/2013 | Budai | .................... | A61L 9/205 362/230 |
| 2014/0049964 A1* | 2/2014 | McClure | ................. | B23P 15/26 362/249.02 |

* cited by examiner

*Primary Examiner* — William J Carter
(74) *Attorney, Agent, or Firm* — Westbridge IP LLC (57) ABSTRACT

An annular LED grow light is disclosed, which comprises a radiator, a light source board, and a power supply box. The light source board is composed of a PCB light board and a plurality of LED lamp beads, wherein the LED lamp beads are arranged on the PCB light board in an annular array about a center. The beneficial effects of the present disclosure are: the photosynthetic photon flux density (PPFD) is distributed more evenly after the LED lamp beads are arranged in an annular array about the center, thus the effective irradiated area is larger, and the cost has been saved.

9 Claims, 10 Drawing Sheets

ANNULAR LED GROW LIGHT

TECHNICAL FIELD

The present disclosure relates to the technical field of lighting, in particular to an annular LED grow light.

RELATED ART

An LED grow light is an artificial light source that utilizes an LED (light emitting diode) as a luminous body to meet light conditions required for plant's photosynthesis. The LED grow light belongs to a third generation of plant supplementary lighting lamps according to types thereof. The LED has many important features that are different from other electric light sources, such as fixed wavelength, high efficiency, energy saving, environmental protection, safety and reliability, long service life, flexible design, and easy installation, which has opened up a new manner of the supplementary lighting lamps. Therefore, the LED is considered as the most promising artificial light source for plant cultivation in the future and has a good development prospect.

Light environment is one of the important physical environmental factors that are indispensable for plant growth and development. Controlling plant morphology by adjusting light quality is a key technology in the field of facility cultivation. When the lighting intensity is above a light compensation point, plant's photosynthesis is larger than its respiration, which can accumulate organic matters. When the lighting intensity is below the light compensation point, plant's respiration is larger than its photosynthesis. In this case, the organic matters are consumed instead of being accumulated; if the light is below the light compensation point for a long time, the plant will gradually wither to cause death. Lights will limit the photosynthesis in the case of weak lighting, as the lights increase, a speed of the photosynthesis will accelerate accordingly. When a lighting intensity increases to a certain intensity that the photosynthesis will not accelerate any long as the lights increase, the lighting intensity is a light saturation point of the photosynthesis. When light energies exceed the amounts that can be utilized by the photosynthetic system, the photosynthetic function is declined which may appear to a photo-inhibition phenomenon.

Therefore, the lighting intensity of the plant's growth environment is controlled at the light saturation point of the photosynthesis thereof, the productivity of the plant is the highest, and the electrical energy can be utilized maximally. The photosynthetic photon flux density (PPFD) of the grow light is evenly distributed, which facilitates for users to adjust the height and brightness thereof. There are mainly two types of LED grow lights on the market, one is a grow light with a square plate structure (quantum plate), the other is a grow light with a strip-shaped spliced structure (octopus), and lamp beads of both grow lights are evenly distributed in columns. When the lamp beads are evenly distributed in columns, the photosynthetic photon flux density (PPFD) is unevenly distributed, the photosynthetic photon flux density (PPFD) at the middle is too high while the surrounding areas are dropped sharply, which makes it difficult to control the height and brightness of the grow light. For example, if the grow light is placed too low, the density at the middle is too high, so the plant will be easily damaged by the lights; if the grow light is placed too high, the density at surrounding areas is too low, thus to affect the plant's growth.

SUMMARY

In order to overcome the above-mentioned disadvantages in the prior art, the present disclosure is achieved through the following technical solutions.

An annular LED grow light comprises: a radiator, a light source board, and a power supply box, wherein the light source board is composed of a PCB light board and a plurality of LED lamp beads, and the LED lamp beads are arranged on the PCB light board in an annular array about a center.

Furthermore, the light source board and the radiator are annular in shape, including a circular ring, an elliptical ring, a square ring and a polygonal ring.

Furthermore, there are one or multiple light source boards. When there are multiple light source boards, which are arranged in a splicing manner or in a manner of a large ring circling a small ring.

Furthermore, a material of the radiator includes one of aluminum material, alloy material, iron, steel and injection molded parts; a substrate of the PCB board includes one of an aluminum substrate, a copper substrate and a composite substrate.

Furthermore, the radiator is arranged on a back of the light source board, and the power supply box is connected to the radiator and located on the back of the light source board.

Furthermore, the power supply box includes a power supply, a control system, and input/output ports, a position of the power supply box includes externally placed on the radiator, or embedded into the radiator, or suspended and placed above the radiator.

Furthermore, the lamp beads include lamp bead combinations of multiple colors and multiple wavelengths.

Furthermore, the annular LED grow light further comprises T-shaped sliding bolts and suspended wires, the T-shaped sliding bolts are used for connecting the power supply box with the radiator; one end of the suspended wire is connected to the radiator, and the other end of the suspended wire is used for suspension.

Furthermore, an arrangement structure of the LED lamp beads is arranged in an annular array about the center, and the arrangement structure comprises: an arrangement structure of a large ring circling a small ring, or an arrangement structure of a ring connecting to another ring.

Furthermore, the annular LED grow light further comprise a plurality of supplementary lighting lamps, wherein the supplementary lighting lamps are located on sides of the light source board.

Furthermore, the annular LED grow light is composed of multiple light source boards that are spliced together.

The beneficial effects of the present disclosure are: the photosynthetic photon flux density (PPFD) is distributed more evenly after the LED lamp beads are arranged in an annular array about the center, thus the effective irradiated area is larger, and the cost has been saved.

REFERENCE NUMBERS annular LED grow light 10, light source board 11, LED lamp beads 111, radiator 12, power supply box 13, dimming handle 131, signal input terminal 132, power output port 133, suspended wires 14, T-shaped sliding bolt 15, supplementary lighting lamps 16.

DETAILED DESCRIPTION

The technical solutions in the embodiments of the present disclosure will be clearly and completely described in conjunction with the accompanying drawings hereafter. Apparently, the described embodiments are part of the embodiments of the present disclosure, rather than all of the embodiments. All other embodiments obtained by persons of ordinary skill in the art based on the embodiments of the present disclosure without creative efforts shall fall within the protecting scope of the present disclosure.

Figure 1:
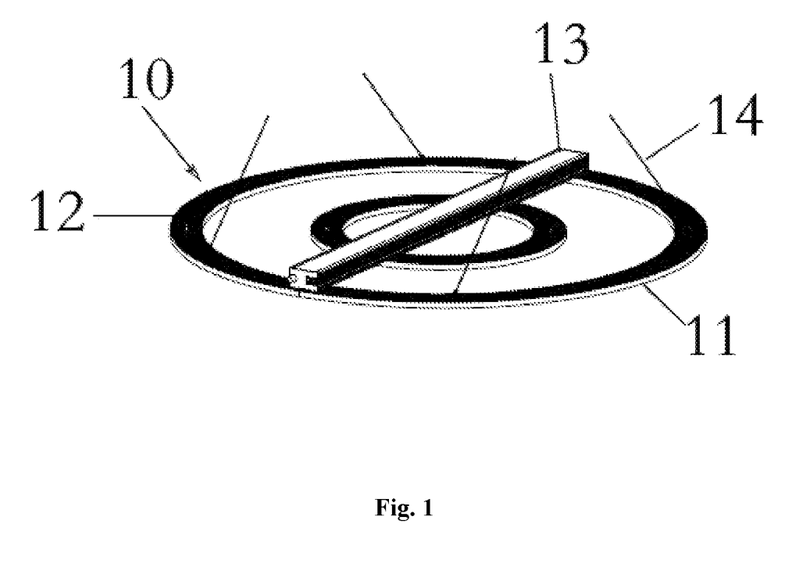
FIG. 1 is a schematic structural view of an annular LED grow light according to Embodiment 1 of the present disclosure.
Figure 2:
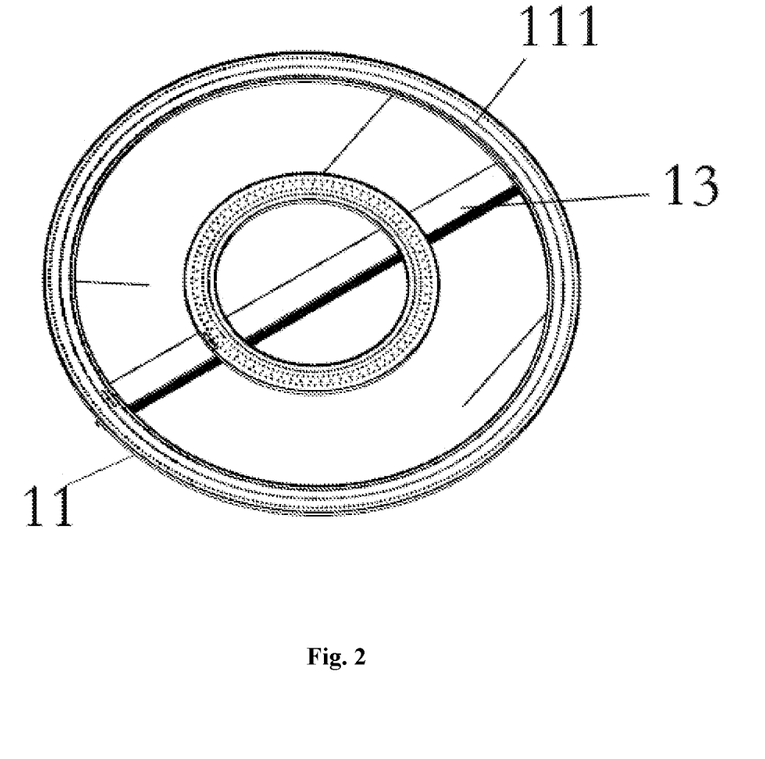
FIG. 2 is a schematic structural view that the LED lamp beads are distributed according to Embodiment 1 of the present disclosure.
Figure 3:
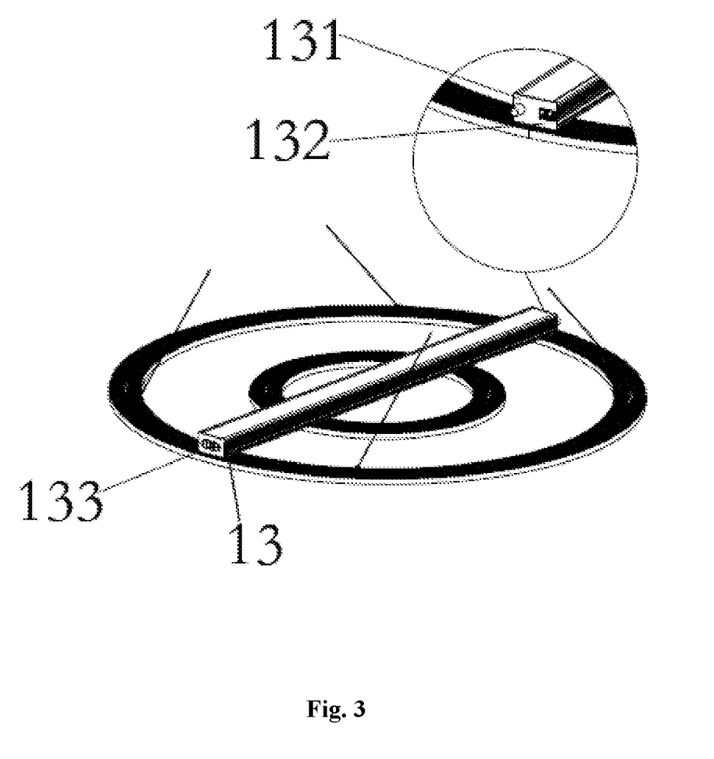
FIG. 3 is a schematic structural view of a power supply box according to Embodiment 1 of the present disclosure.

As shown in FIG. 1 to FIG. 2, an annular LED grow light 10 comprises a radiator 12, a light source board 11, and a power supply box 13. The light source board 11 is composed of a PCB light board (not shown in the figures) and LED lamp beads 111, and the LED lamp beads 111 are arranged on the PCB light board in an annular array about a center.

As shown in FIG. 2, the light source board 11 is composed of the PCB light board and LED lamp beads 111, and the LED lamp beads 111 are arranged on the PCB light board in an annular array about the center. The photosynthetic photon flux density (PPFD) can be distributed more evenly with such arrangement, and the same number of lamp beads being arranged in an annular array about the center can achieve a larger effective irradiated area, and the cost has been saved. When a PPFD value is higher than a lighting intensity required by a light saturation point of a plant, the extra light energies will not be absorbed, and the higher light energies will even inhibit the plant's growth. When the PPFD value is lower than the lighting intensity required for the plant's growth, the plant will grow slowly. Therefore, the PPFD value required by the plant is evenly distributed, which is beneficial to improve the utilization of the electric energies, and the production value per unit of the electricity is higher.

In the embodiment of the present disclosure, the light source board 11 and the radiator 12 are annular in shape, including a circular ring, an elliptical ring, a square ring and a polygonal ring. In other embodiments, they may also have other shapes, and the characteristic of the arrangement of LED lamp beads 111 thereof is that the LED lamp beads are arranged in an annular array about the center.

In the present disclosure, a shape of the light source board 11 is the same as that of the radiator 12. Such as, if the light source board is circular, the radiator is also circular with the same structure and size.

Figure 5:
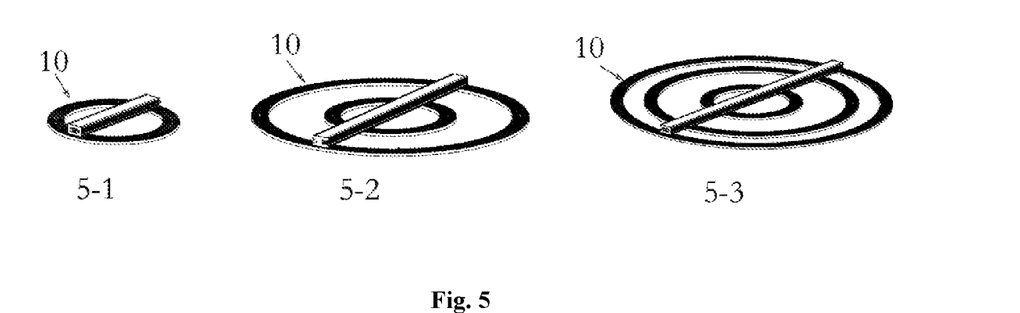
FIG. 5 is a schematic structural view of the annular LED grow light according to Embodiment 1 of the present disclosure, wherein 5-1 is a structural view of a single-ring LED grow light; 5-2 is a structural view of a double-ring LED grow light; 5-3 is a structural view of a triple-ring LED grow light.
Figure 10:
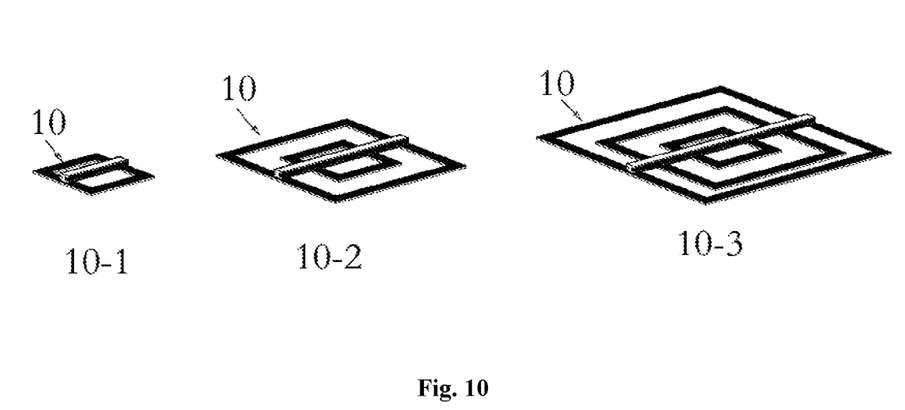
FIG. 10 is a schematic structural view of the annular LED grow light according to Embodiment 2 of the present disclosure, wherein 10-1 is a structural view of a single-ring LED grow light; 10-2 is a structural view of a double-ring LED grow light; 10-3 is a structural view of a triple-ring LED grow light.

As shown in FIG. 5 and FIG. 10, in the embodiment of the present disclosure, there is one or multiple light source boards. When there are multiple light source boards, which are arranged in a splicing manner or a manner of a large ring circling a small ring.

In the embodiment of the present disclosure, the radiator 12 is provided on a back of the light source board 11, and the radiator 12 is closely connected to the light source board 11 and fixed by T-shaped sliding bolts 15. The power supply box 13 is strip-shaped, which is arranged on the radiator 12 and fixed through the T-shaped sliding bolts 15. There are a plurality of suspended wires 14 whose one end is fixed on the radiator 12 through the T-shaped sliding bolts 15.

When there are multiple light source boards 11, the number of radiators 12 is the same as that of the light source boards 11, and a position of the power supply box 13 is arranged on centers of all the light source boards 11.

Figure 4:
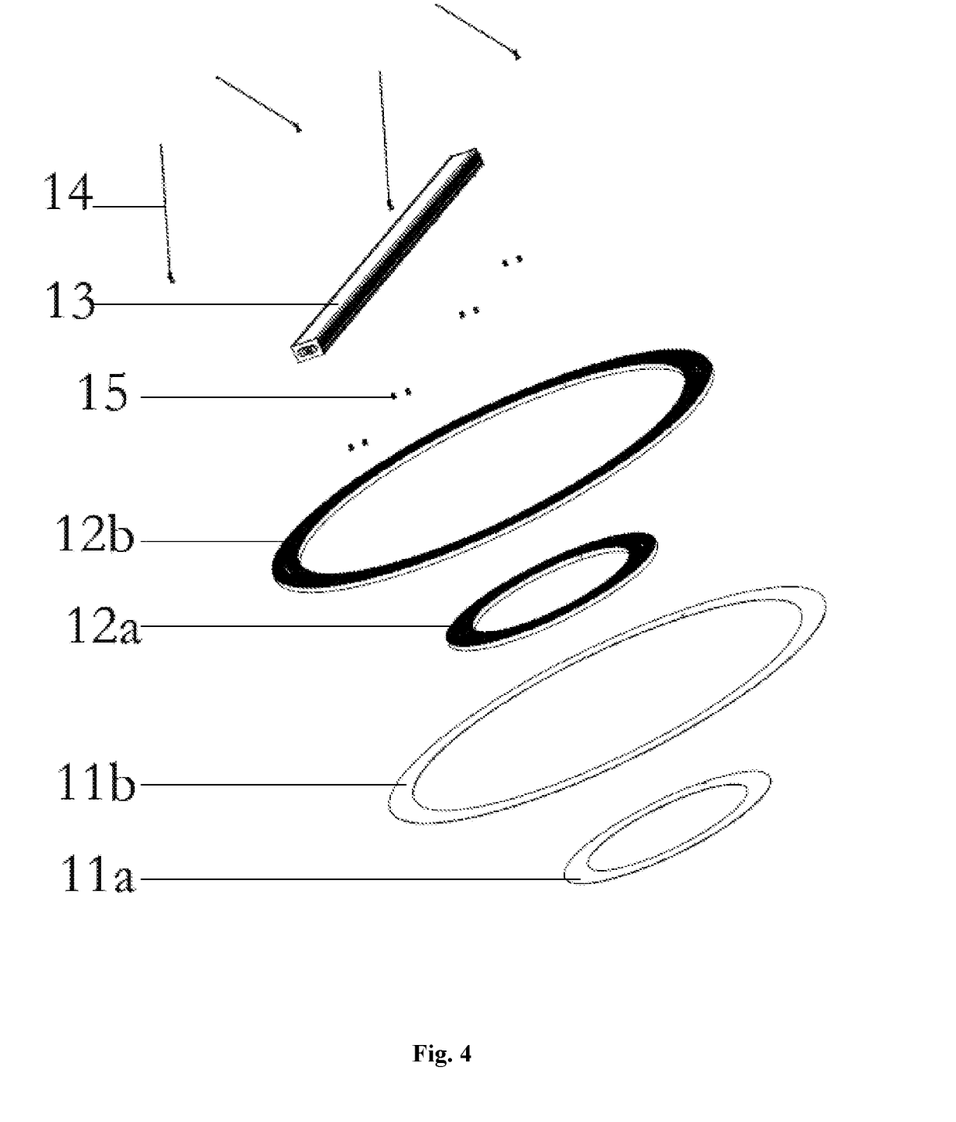
FIG. 4 is an exploded structural view of FIG. 1.

FIG. 5 shows multiple arrangement manners of the circular light source boards. 5-1 is an LED grow light 10 with a single circular light source board, which has a circular light source board, a radiator and a power supply box that are connected as described above. 5-2 is an LED grow light 10 with double circular light source boards, please refer to FIG. 4 for details, which includes two circular light source boards (11a, 11b) arranged in a manner of a large ring circling a small ring, two radiators (12a, 12b) and a power supply box 13, wherein the power supply box 13 is connected to the radiators (12a, 12b). 5-3 is an LED grow light 10 with three light source boards, which comprises three circular light source boards, three radiators and a power supply box. The three circular light source boards are arranged in a manner of a large ring circling a small ring, and the assembled structure is connected as described above.

FIG. 10 shows multiple arrangement manners of the square ring-shaped light source boards. 10-1 is an LED grow light 10 with a single square ring-shaped light source board, which has a square ring-shaped light source board, a radiator and a power supply box that are connected in the above manner. 10-2 is an LED grow light 10 with double square ring-shaped light source boards, please refer to FIG. 4 for details, which comprises two square ring-shaped light source boards (11a, 11b) arranged in a manner of a large ring circling a small ring, two radiator (12a, 12b) and a power supply box, wherein the power supply box is connected with the radiator (12a, 12b). 10-3 is an LED grow light 10 with three light source boards, which includes three square ring-shaped light source boards, three radiators and a power supply box. The three square ring-shaped light source boards are arranged in a manner of a large ring circling a small ring, and the assembled structure is connected as described above.

In other embodiments of the present disclosure, there can be more than 3 annular light source boards, which can be arranged in a manner of a large ring circling a small ring. The structure of the LED grow light is as described above.

In the embodiment of the present disclosure, the material of the radiator 12 includes aluminum material, alloy material, iron, steel, injection-molded parts and other materials that are easy to radiate heats, and the radiator 12 is made of one of the materials. The radiator 12 is arranged on a back of the light source board 11, the power supply box 13 is connected to the radiator 12 and located on the back of the light source board 11, and the power supply box 13 is connected with the radiator 12 through multiple manners.

In the embodiment of the present disclosure, a substrate of the PCB board (not shown in the figures) includes an aluminum substrate, a copper substrate or a composite substrate and is made of one of the materials therein.

In the embodiment of the present disclosure, the power supply box 13 includes a power supply, a control system, and an input/output port. The power supply box 13 can be externally placed on the radiator 12 of the grow light, can be embedded into the radiator 12, can be built-in and hidden in the radiator 12; or can also be suspended and placed, or placed in other forms, and all these arrangements are within the protective scope.

In the embodiment of the present disclosure, the lamp beads are composed of lamp beads with various colors and wavelengths, which have full-spectrum artificial light sources, and the spectrum is required for the plant's growth. In a greenhouse or a plant laboratory, the natural light can be completely replaced, thus to promote the plant growth.

In the embodiment of the present disclosure, the annular LED grow light 10 further includes a plurality of T-shaped sliding bolts 15 and a plurality of suspended wires 14. The T-shaped sliding bolts are used for connecting the power supply box 13 with the radiator 12, and one end of the suspended wire 14 is connected to the radiator 12, and the other end is used for suspension.

In the embodiment of the present disclosure, an arrangement structure of the LED lamp beads is arranged in an annular array about the center, and the arrangement structure includes: an arrangement structure of a large ring circling a small ring or an arrangement structure of a ring connecting to another ring.

Figure 6:
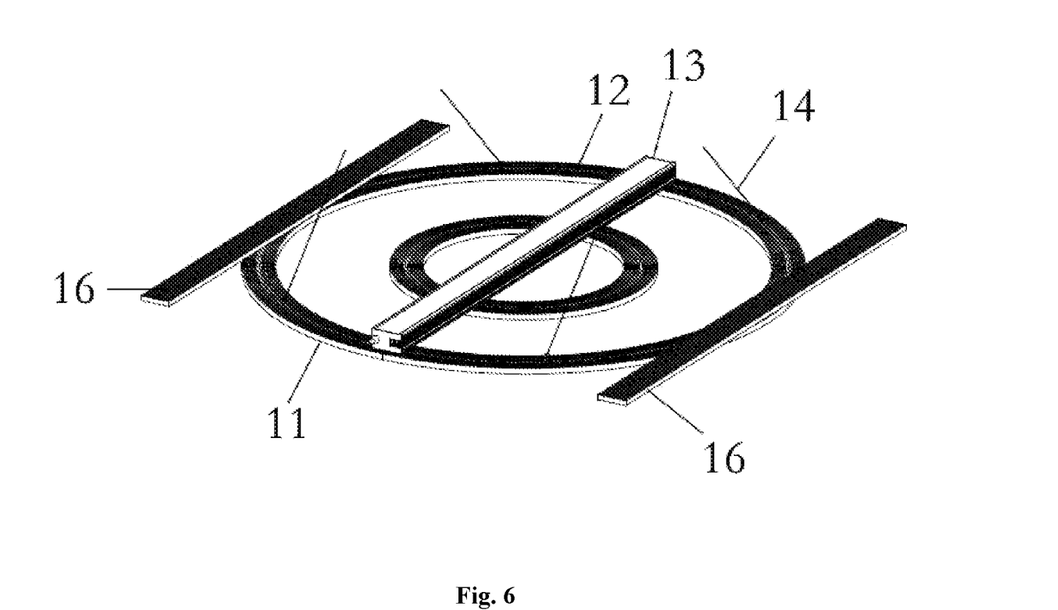
FIG. 6 is a schematic structural view of supplementary lighting lamps according to Embodiment 1 of the present disclosure.

In the embodiment of the present disclosure, as shown in FIG. 6, the annular LED grow light 10 further includes a plurality of supplementary lighting lamps 16 located on the sides of the light source board 11. The supplementary lighting lamps 16 make the photosynthetic photon flux density (PPFD) distribute more evenly.

In the embodiment of the present disclosure, as shown in FIG. 11 to FIG. 14, the annular LED grow light 10 is composed of multiple light source boards that are spliced together.

In the embodiment of the present disclosure, the annular LED grow light 10 can be controlled manually, can be controlled remotely, or can be controlled by a computer, thereby adjusting the brightness, switches and other functions.

Embodiment 1

As shown in FIG. 1 to FIG. 5, an annular LED grow light 10 is composed of a circular radiator 12, a light source board 11, a power supply box 13, T-shaped sliding bolts 15, and suspended wires 14. LED lamp beads 111 of the light source board 11 are arranged in an annular array about the center and the power supply box 13 can be arranged on the radiator 12.

Optionally, the annular LED grow light 10 can also be composed of a single or multiple circular ring-shaped radiators 12 and light source boards 11, and the LED lamp beads 111 of the light source board 11 are arranged in an annular array about the center, or a large ring circling a small ring, or a ring connecting to another ring.

Comparison table 1 shows the irradiation differences under the conditions of the same lamp bead type and quantity, the same current, the same energy consumption and the same height while only the distributions of the annular rings of the lamp beads are changed. See the comparison table 1, which includes two distribution tables of the lighting intensities that two 46 INCH*46 INCH lamps irradiate an area of 120*120 CM at a height of 30 CM, wherein the LED lamp beads are respectively arranged in columns and arranged in an annular array about the center. It can be seen that under the same conditions, the photosynthetic photon flux density (PPFD) is distributed more evenly when the LED lamp beads are arranged in an annular array about the center, and the effective irradiated area is larger.

Table 1 is the comparison of the distribution of the lighting intensities PPFD between the solution of Embodiment 1 and the existing technology.

Here is the distribution table of the lighting intensities PPFD that the lamp beads of the 46 INCH*46 INCH lamp are evenly distributed in columns and irradiate the area of 120*120 CM at the height of 30 CM. (octopus)

| | | | | | | | | | |
|---|---|---|---|---|---|---|---|---|---|
| 515 | 636 | 704 | 714 | 729 | 730 | 716 | 708 | 644 | 521 |
| 609 | 748 | 825 | 837 | 855 | 856 | 840 | 830 | 757 | 620 |
| 656 | 804 | 886 | 899 | 919 | 920 | 903 | 892 | 814 | 668 |
| 660 | 805 | 808 | 900 | 921 | 922 | 905 | 893 | 815 | 674 |
| 670 | 818 | 903 | 915 | 936 | 937 | 920 | 909 | 828 | 683 |
| 669 | 817 | 902 | 914 | 935 | 937 | 919 | 908 | 828 | 682 |
| 659 | 804 | 887 | 899 | 919 | 920 | 903 | 892 | 814 | 671 |
| 654 | 802 | 884 | 897 | 917 | 918 | 901 | 890 | 812 | 667 |
| 607 | 747 | 826 | 837 | 855 | 857 | 841 | 831 | 758 | 619 |
| 512 | 631 | 696 | 708 | 722 | 724 | 711 | 702 | 640 | 520 |

|----------------------------------------------------------------------------------------|

0.00                                                                               1.20m

Here is the distribution table of the lighting intensities PPFD that the lamp beads of the 46 INCH*46 INCH lamp are distributed in annular array and irradiate the area of 120*120 CM at the height of 30 CM.

| | | | | | | | | | |
|---|---|---|---|---|---|---|---|---|---|
| 526 | 646 | 732 | 792 | 836 | 834 | 792 | 731 | 654 | 531 |
| 619 | 761 | 880 | 894 | 915 | 915 | 895 | 880 | 767 | 630 |
| 731 | 881 | 912 | 910 | 928 | 929 | 911 | 911 | 881 | 740 |
| 792 | 894 | 911 | 927 | 935 | 935 | 927 | 910 | 895 | 802 |
| 834 | 914 | 927 | 934 | 902 | 902 | 935 | 927 | 917 | 844 |
| 834 | 914 | 927 | 935 | 902 | 902 | 935 | 927 | 921 | 846 |
| 791 | 894 | 910 | 926 | 935 | 934 | 928 | 911 | 894 | 800 |
| 731 | 881 | 911 | 910 | 928 | 927 | 910 | 911 | 881 | 739 |
| 617 | 761 | 881 | 896 | 920 | 920 | 898 | 880 | 768 | 629 |
| 524 | 641 | 737 | 799 | 846 | 846 | 800 | 736 | 650 | 530 |

|◼----------------------------------------------------------------------------------------------|
0.00                                                                                       1.20m

Embodiment 2

As shown in FIG. 7 to FIG. 10, an annular LED grow light 10 is a square ring composed of a square radiator 12, a light source board 11, a power supply box 13, a plurality of T-shaped sliding bolts 15 and a plurality of suspended wires 14. LED lamp beads 111 are arranged in an annular array about the center, and the power supply box 13 can be embedded and arranged into the radiator 12. In addition, the annular LED grow light 10 can also be composed of a single or multiple square ring-shaped radiators 12 and light source boards 11, wherein large rings can circle small rings to form annular LED grow lights with various powers, or rings are connected to rings to form annular LED grow lights with various powers.

Comparison table 2 shows the irradiation differences under the conditions of the same lamp bead type and quantity, the same current, the same energy consumption and the same height while only the distributions of the annular rings of the lamp beads are changed. See the comparison table 2, which includes two distribution tables of the light intensities that two 46 INCH*46 INCH lamps irradiate an area of 120*120 CM at a height of 30 CM, wherein the LED lamp beads are respectively arranged in columns and arranged in an annular array about the center. It can be seen that under the same conditions, the photosynthetic photon flux density (PPFD) is distributed more evenly when the LED lamp beads are arranged in an annular array about the center, and the effective irradiated area is larger.

Table 2 is the comparison of the distribution of the lighting intensities PPFD between the solution of Embodiment 2 and the existing technology.

Here is the distribution table of the lighting intensities PPFD that the lamp beads of the 46 INCH*46 INCH lamp are evenly distributed in columns and irradiate an area of 120*120 CM at a height of 30 CM. (octopus)

| | | | | | | | | | |
|---|---|---|---|---|---|---|---|---|---|
| 515 | 636 | 704 | 714 | 729 | 730 | 716 | 708 | 644 | 521 |
| 609 | 748 | 825 | 837 | 855 | 856 | 840 | 830 | 757 | 620 |
| 656 | 804 | 886 | 899 | 919 | 920 | 903 | 592 | 814 | 668 |
| 660 | 805 | 888 | 900 | 921 | 922 | 905 | 893 | 815 | 574 |
| 670 | 818 | 903 | 915 | 936 | 937 | 920 | 909 | 828 | 683 |
| 669 | 817 | 902 | 914 | 935 | 937 | 919 | 908 | 828 | 582 |
| 659 | 804 | 887 | 899 | 919 | 920 | 903 | 892 | 814 | 671 |
| 654 | 802 | 884 | 897 | 917 | 918 | 901 | 890 | 812 | 667 |
| 607 | 747 | 826 | 837 | 855 | 857 | 841 | 831 | 758 | 619 |
| 512 | 631 | 696 | 708 | 722 | 724 | 711 | 702 | 640 | 520 |

|◼----------------------------------------------------------------------------------------------|
0.00                                                                                       1.20m

Here is the distribution table of the lighting intensities PPFD that the lamp beads of the 46 INCH*46 INCH lamp are distributed in annular array and irradiate the area of 120*120 CM at the height of 30 CM.

| | | | | | | | | | |
|---|---|---|---|---|---|---|---|---|---|
| 625 | 647 | 699 | 698 | 705 | 705 | 700 | 703 | 654 | 531 |
| 645 | 786 | 804 | 799 | 805 | 804 | 803 | 809 | 795 | 651 |
| 695 | 804 | 809 | 807 | 811 | 810 | 810 | 812 | 812 | 700 |
| 696 | 801 | 809 | 807 | 799 | 798 | 809 | 812 | 806 | 699 |
| 703 | 807 | 813 | 798 | 757 | 757 | 801 | 814 | 810 | 703 |
| 704 | 809 | 814 | 799 | 757 | 758 | 803 | 816 | 514 | 703 |
| 700 | 805 | 811 | 809 | 801 | 801 | 814 | 817 | 809 | 698 |
| 699 | 809 | 812 | 811 | 815 | 815 | 816 | 818 | 814 | 702 |
| 649 | 792 | 812 | 807 | 812 | 813 | 812 | 819 | 801 | 653 |
| 524 | 648 | 699 | 698 | 704 | 705 | 702 | 705 | 653 | 530 |

|◼----------------------------------------------------------------------------------------------|
0.00                                                                                       1.20m

Embodiment 3

Figure 7:
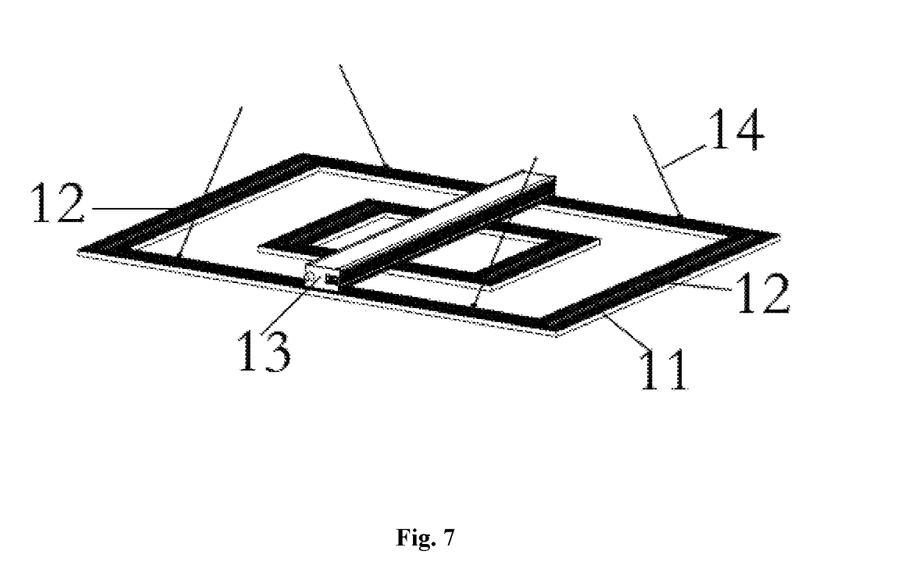
FIG. 7 is a schematic structural view of the annular LED grow light according to Embodiment 2 of the present disclosure.
Figure 8:
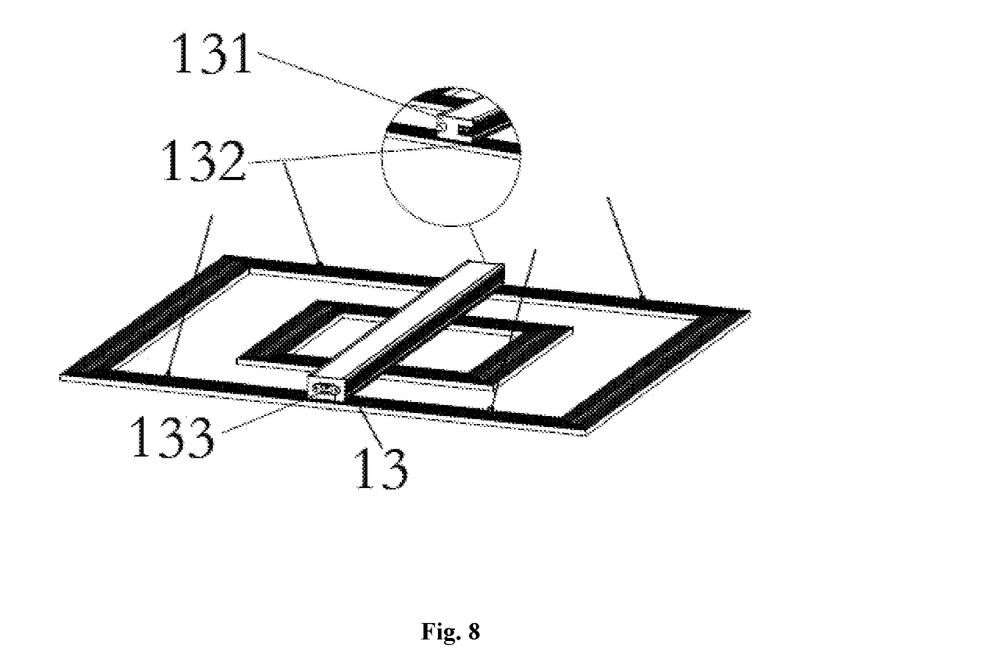
FIG. 8 is a schematic structural view of the power supply box according to Embodiment 2 of the present disclosure.
Figure 9:
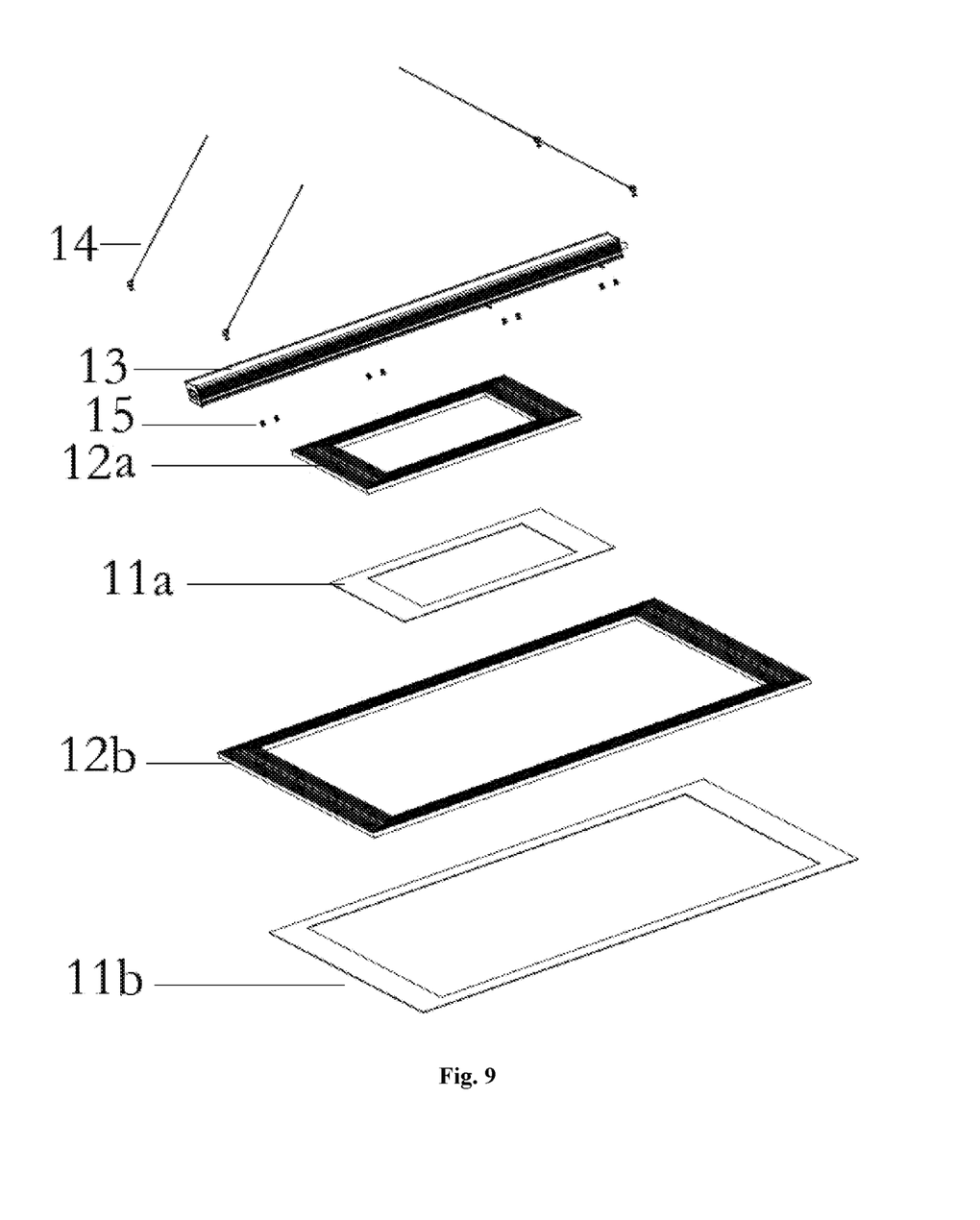
FIG. 9 is an exploded structural view of FIG. 7.
Figure 11:
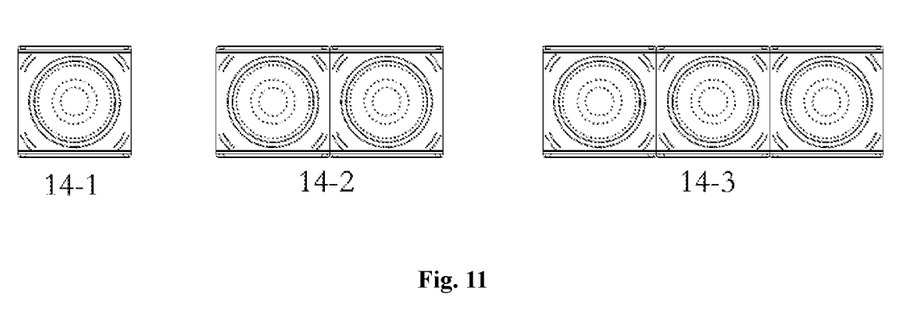
FIG. 11 is a schematic structural view of the LED grow light according to Embodiment 3 of the present disclosure.
Figure 12:
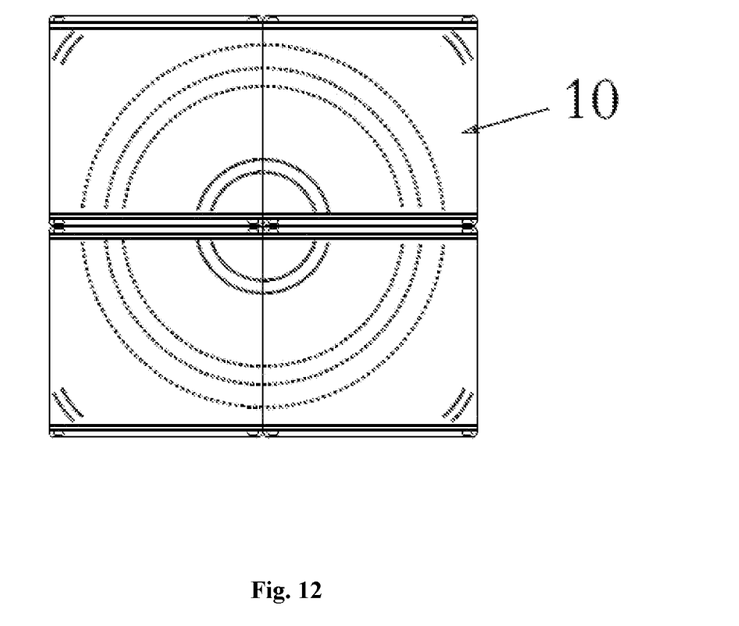
FIG. 12 is a schematic structural view of multiple LED grow lights that are spliced together according to Embodiment 3 of the present disclosure.

As shown in FIG. 7, and FIG. 11 to FIG. 12, an annular LED grow light 10 is composed of a radiator 12 of a square quantum plate, a light source board 11, a power supply box 13, T-shaped sliding bolts 15 and suspended wires 14. LED lamp beads 111 of the light source board 11 are arranged in an annular array about the center, and the power supply box 13 can be placed and arranged on the radiator 12. In addition, the annular LED grow light 10 can also be spliced by a single or multiple light source boards 11 (1+n lights) to form annular LED grow lights with various powers.

Comparison table 3 shows the irradiation differences under the conditions of the same lamp bead type and quantity, the same current, the same energy consumption and the same height while only the distributions of the annular rings of the lamp beads are changed. See the comparison table 3, which includes two distribution tables of the lighting intensities that two 12 INCH*12 INCH lamps irradiate an area of 60*60 CM at a height of 30 CM, wherein the LED lamp beads are respectively arranged in columns and arranged in an annular array about the center. It can be seen that under the same conditions, the photosynthetic photon flux density (PPFD) is distributed more evenly when the LED lamp beads are arranged in an annular array about the center, and the effective irradiated area is larger.

Table 3 is the comparison of the distribution of the lighting intensities PPFD between the solution of Embodiment 3 and the existing technology.

Here is the distribution table of the lighting intensities PPFD that the lamp beads of the 12 INCH*12 INCH lamp are evenly distributed in columns and irradiate the area of 60*60 CM at the height of 30 CM. (quantum plate)

| | | | | | |
|---|---|---|---|---|---|
| 279 | 385 | 440 | 384 | 284 | 0.60 m |
| 386 | 552 | 648 | 553 | 388 | |
| 441 | 649 | 773 | 649 | 445 | |
| 385 | 552 | 647 | 552 | 388 | |
| 275 | 382 | 436 | 383 | 279 | |
| ■ | | | | | 0.00 |
| \|---------------------------------------------------------------\| | | | | | |
| 0.00 | | | 0.60 m | | |

Here is the distribution table of the lighting intensities PPFD that the lamp beads of the 12 INCH*12 INCH lamp are distributed in annular array and irradiate the area of 60*60 CM at the height of 30 CM.

| | | | | | |
|---|---|---|---|---|---|
| 326 | 456 | 524 | 456 | 331 | 0.60 m |
| 456 | 655 | 759 | 655 | 457 | |
| 521 | 759 | 879 | 760 | 525 | |
| 455 | 654 | 759 | 655 | 457 | |
| 323 | 455 | 520 | 455 | 327 | |
| ■ | | | | | 0.00 |
| \|---------------------------------------------------------------\| | | | | | |
| 0.00 | | | 0.60 m | | |

As shown in FIG. 12, the annular LED grow light 10 can be composed of the radiators 12 of 4 square quantum plates and light source boards 11. The LED lamp beads 111 are arranged in an annular array about the center.

Embodiment 4

Figure 13:
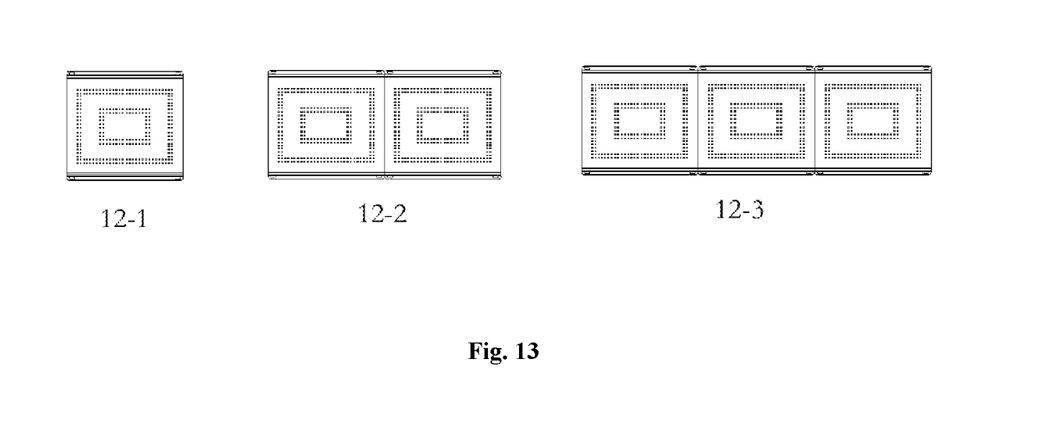
FIG. 13 is a schematic structural view of the LED grow light according to Embodiment 4 of the present disclosure.
Figure 14:
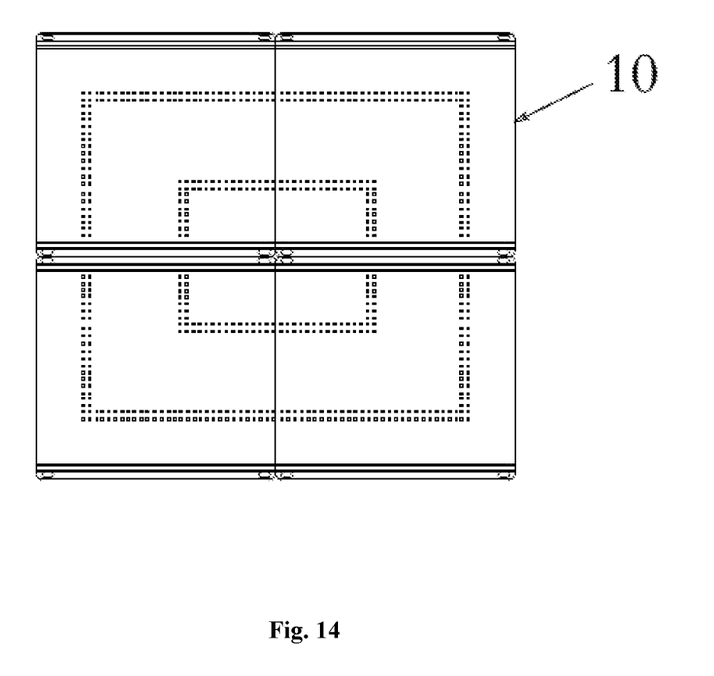
FIG. 14 is a schematic structural view of multiple LED grow lights that are spliced together according to Embodiment 4 of the present disclosure.

As shown in FIG. 7, and FIG. 13 to FIG. 14, an annular LED grow light 10 is composed of a radiator 12 of a square quantum plate, a light source board 11, a power supply box 13, T-shaped sliding bolts 15 and suspended wires 14. LED lamp beads 111 of the light source plate 11 are arranged in a square ring-shaped array about the center, and can also be a circular ring, a square ring, or a ring array of other shapes. The power supply box 13 can be placed and arranged on the radiator 12. Moreover, the annular LED grow light 10 can also be spliced by a single or multiple light source boards 11 (1+n lights), thus to form annular LED grow lights with various powers; or the radiator 12 can also be spliced by 4, the LED lamp beads 111 thereof are arranged in a square ring-shaped array about the center.

In the embodiment of the present disclosure, the principle that the LED lamp beads 111 are arranged in a central annular array is not only suitable for the LED grow lights 10, but also suitable for lighting fixtures, which can make the lights distribute more evenly.

Although the embodiments of the present disclosure have been described in the above, those of ordinary skill in the art can understand that various changes, modifications, replacements and substitutions can be made to these embodiments without departing from the principle and spirit of the present disclosure. The scope of the present disclosure is defined by the appended claims and their equivalents.

What is claimed is:

1. An annular LED (light emitting diode) grow light, comprising: a radiator, a light source board, and a power supply box, wherein the light source board is composed of a PCB (printed circuit board) light board and a plurality of LED lamp beads, and the LED lamp beads are arranged on the PCB light board in a plurality of annular arrays about a center and arranged in a same plane, the radiator and the power supply box are provided on a back of the light source board, and the radiator is directly connected to the light source board and has a same shape as the light source board, the power supply box is strip-shaped, arranged across the radiator and the light source board.

2. The annular LED grow light according to claim 1, wherein an arrangement structure of the LED lamp beads is arranged in an annular array about the center, and the arrangement structure comprises: an arrangement structure of a large ring circling a small ring, or an arrangement structure of a ring connecting to another ring.

3. The annular LED grow light according to claim 1, wherein the light source board and the radiator are ring, comprising a circular ring, an elliptical ring, a square ring and a polygonal ring.

4. The annular LED grow light according to claim 3, wherein there is one or multiple light source boards; multiple light source boards are arranged in a splicing manner or in a manner of a large ring circling a small ring.

5. The annular LED grow light according to claim 1, wherein a material of the radiator comprises one of aluminum material, alloy material, iron, steel and injection molded parts; a substrate of the PCB board comprises one of an aluminum substrate, a copper substrate, and a composite substrate.

6. The annular LED grow light according to claim 1, wherein the power supply box comprises a power supply, a control system, and input/output ports, a position of the power supply box comprises externally placed on the radiator, or embedded into the radiator, or suspended and placed above the radiator.

7. The annular LED grow light according to claim 1, wherein the lamp beads comprise lamp bead combinations of multiple colors and multiple wavelengths.

8. The annular LED grow light according to claim 1, wherein the annular LED grow light further comprises T-shaped sliding bolts and a plurality of suspended wires, the T-shaped sliding bolts are used for connecting the power supply box with the radiator; one end of each suspended wire is connected to the radiator, and the other end of each suspended wire is used for suspension.

9. The annular LED grow light according to claim 1, further comprising a plurality of supplementary lighting lamps, wherein the supplementary lighting lamps are located on sides of the light source board.

\* \* \* \* \*